United States Patent
Zamir et al.

(10) Patent No.: US 11,037,278 B2
(45) Date of Patent: Jun. 15, 2021

(54) SYSTEMS AND METHODS FOR TRANSFORMING RAW SENSOR DATA CAPTURED IN LOW-LIGHT CONDITIONS TO WELL-EXPOSED IMAGES USING NEURAL NETWORK ARCHITECTURES

(71) Applicant: Inception Institute of Artificial Intelligence, Ltd., Abu Dhabi (AE)

(72) Inventors: Syed Waqas Zamir, Abu Dhabi (AE); Salman Hameed Khan, Abu Dhabi (AE); Fahad Shahbaz Khan, Abu Dhabi (AE); Aditya Arora, Abu Dhabi (AE); Ling Shao, Abu Dhabi (AE)

(73) Assignee: INCEPTION INSTITUTE OF ARTIFICIAL INTELLIGENCE, LTD., Al Maryah Island (AE)

( * ) Notice: Subject to any disclaimer, the term of this patent is extended or adjusted under 35 U.S.C. 154(b) by 53 days.

(21) Appl. No.: 16/254,796

(22) Filed: Jan. 23, 2019

(65) Prior Publication Data

US 2020/0234414 A1 Jul. 23, 2020

(51) Int. Cl.
*G06T 5/00* (2006.01)
*G06N 3/08* (2006.01)
*G06T 5/50* (2006.01)
*G06N 20/00* (2019.01)

(52) U.S. Cl.
CPC ............. *G06T 5/007* (2013.01); *G06N 3/08* (2013.01); *G06N 20/00* (2019.01); *G06T 5/001* (2013.01); *G06T 5/50* (2013.01); *G06T 2207/20081* (2013.01); *G06T 2207/20084* (2013.01)

(58) Field of Classification Search
CPC ........... G06T 5/007; G06T 5/001; G06T 5/50; G06N 20/00; G06N 3/08
See application file for complete search history.

(56) References Cited

FOREIGN PATENT DOCUMENTS

CN 109146780 A 1/2019

OTHER PUBLICATIONS

Chen et al: "Learning to See in the Dark", IEEE, 2018. (Year: 2018).*
Zhao et al, "Loss Functions for Image Restoration With Neural Networks", IEEE, 2017. (Year: 2017).*
Dosovitskiy, et al. "Generating Images with Perceptual Similarity Metrics Based on Deep Networks," Advances in Neural Information Processing Systems, 2016.
(Continued)

*Primary Examiner* — Ruiping Li
(74) *Attorney, Agent, or Firm* — Bryan Cave Leighton Paisner LLP (57) ABSTRACT

This disclosure relates to improved techniques for generating images from raw image sensor data captured in low-light conditions without the use of flash photography. The techniques described herein utilize a neural network architecture to transform the raw image sensor data into well-exposed images. The neural network architecture can be trained using a multi-criterion loss function that jointly models both pixel-level and feature-level properties of the images. The images output by the neural network architecture can be provided to a contrast correction module that enhances the contrast of the images.

20 Claims, 5 Drawing Sheets
(2 of 5 Drawing Sheet(s) Filed in Color)

(56) References Cited

OTHER PUBLICATIONS

Wu, et al. "SRPGAN: Perceptual Generative Adversarial Network for Single Image Super Resolution," arXiv prepring, 2017.
Li, et al. "A Low-Light Image Enhancement Method for Both Denoising and Contrast Enlarging," IEEE International Conference on Image Processing (ICIP) 2015.
M. Bertalmío and S. Levine. Variational approach for the fusion of exposure bracketed pairs. TIP, 22(2):712-723, 2013.
R. Zhang, P. Isola, A. A. Efros, E. Shechtman, and O. Wang. The unreasonable effectiveness of deep features as a perceptual metric. In CVPR, 2018.
C. Chen, Q. Chen, J. Xu, and V. Koltun. Learning to see in the dark. In CVPR, 2018.
Q. Chen, J. Xu, and V. Koltun. Fast image processing with fully-convolutional networks. In ICCV, 2017.
J. Deng, W. Dong, R. Socher, L. Li, K. Li, and L. Fei-Fei. ImageNet: A large-scale hierarchical image database. In CVPR, 2009.
C. Dong, C. C. Loy, K. He, and X. Tang. Image super-resolution using deep convolutional networks. TPAMI, 38(2):295-307, 2016.
M. Gharbi, J. Chen, J. T. Barron, S. W. Hasinoff, and F. Durand. Deep bilateral learning for real-time image enhancement. TOG, 36(4):118, 2017.
I. Goodfellow, J. Pouget-Abadie, M. Mirza, B. Xu, D. Warde-Farley, S. Ozair, A. Courville, and Y. Bengio. Generative adversarial nets. In NIPs, 2014.
B. K. Gunturk, J. Glotzbach Y. Altunbasak, R. W. Schafer, and R. M. Mersereau. Demosaicking: color filter array interpolation. IEEE Signal Processing Magazine, 22(1):44-54, 2005.
S. Guo, Z. Yan, K. Zhang, W. Zuo, and L. Zhang. Toward convolutional blind denoising of real photographs. arXiv preprint arXiv:1807.04686, 2018.
X. Guo, Y. Li, and H. Ling. LIME: low-light image enhancement via illumination map estimation. TIP, 26(2):982-993, 2017.
S. W. Hasinoff, D. Sharlet, R. Geiss, A. Adams, J. T. Barron, F. Kainz, J. Chen, and M. Levoy. Burst photography for high dynamic range and low-light imaging on mobile cameras. TOG, 35(6):192, 2016.
K. He, J. Sun, and X. Tang. Single image haze removal using dark channel prior. TPAMI, 33(12):2341-2353, 2011.
K. He, X. Zhang, S. Ren, and J. Sun. Deep residual learning for image recognition. In CVPR, 2016.
M. He, D. Chen, J. Liao, P. V. Sander, and L. Yuan. Deep exemplar-based colorization. TOG, 37(4):47, 2018. 2.
J. Johnson, A. Alahi, and L. Fei-Fei. Perceptual losses for real-time style transfer and super-resolution. In ECCV, 2016.
H. C. Karaimer and M. S. Brown. Improving color reproduction accuracy on cameras. In CVPR, 2018.
F. Kokkinos and S. Lefkimmiatis. Deep image demosaicking using a cascade of convolutional residual denoising networks. In ECCV, 2018.
A. Krizhevsky, I. Sutskever, and G. E. Hinton. ImageNet classification with deep convolutional neural networks. In NIPS, 2012.
W.-S. Lai, J.-B. Huang, N. Ahuja, and M.-H. Yang. Deep laplacian pyramid networks for fast and accurate super-resolution. In CVPR, 2017.
S. Lefkimmiatis. Universal denoising networks: A novel CNN architecture for image denoising. In CVPR, 2018.
G. Liu, F. A. Reda, K. J. Shih, T.-C. Wang, A. Tao, and B. Catanzaro. Image inpainting for irregular holes using partial convolutions. In ECCV, 2018.
J. Long, E. Shelhamer, and T. Darrell. Fully convolutional networks for semantic segmentation. In CVPR, 2015.
K. G. Lore, A. Akintayo, and S. Sarkar. LLNet: a deep autoencoder approach to natural low-light image enhancement. Pattern Recognition, 61:650-662,2017.
A. Łoza D. R. Bull, P. R. Hill, and A. M. Achim. Automatic contrast enhancement of low-light images based on local statistics of wavelet coefficients. Digital Signal Processing, 23(6):1856-1866, 2013.
R. Mantiuk, S. Daly, and L. Kerofsky. Display adaptive tone mapping. TOG, 27(3):1-10, 2008.
J. Morovič. Color gamut mapping, vol. 10. Wiley, 2008.
S. Nah, T. H. Kim, and K. M. Lee. Deep multi-scale convolutional neural network for dynamic scene deblurring. In CVPR, 2017.
A. Odena, V. Dumoulin, and C. Olah. Deconvolution and checkerboard artifacts. Distill, 2016.
R. Palma-Amestoy, E. Provenzi, M. Bertalmío, and V. Caselles. A perceptually inspired variational framework for color enhancement. TPAMI, 31(3):458-474, 2009.
D. Pathak, P. Krahenbuhl, J. Donahue, T. Darrell, and A. A. Efros. Context encoders: Feature learning by inpainting. In CVPR, 2016.
T. Plotz and S. Roth. Benchmarking denoising algorithms with real photographs. In CVPR, 2017.
E. Prashnani, H. Cai, Y. Mostofi, and P. Sen. PieAPP: Perceptual image-error assessment through pairwise preference. In CVPR, 2018.
R. Ramanath, W. E. Snyder, Y. Yoo, and M. S. Drew. Color image processing pipeline. IEEE Signal Processing Magazine, 22(1):34-43, 2005.
O. Ronneberger, P. Fischer, and T. Brox. U-net: Convolutional networks for biomedical image segmentation. In MIC-CAI, 2015.
E. Schwartz, R. Giryes, and A. M. Bronstein. DeepISP: Towards learning an end-to-end image processing pipeline. TIP, 2018. (Early Access).
L. Shen, Z. Yue, F. Feng, Q. Chen, S. Liu, and J. Ma. Msr-net: Low-light image enhancement using deep convolutional network. arXiv, 2017.
W. Shi, J. Caballero, F. Huszár, J. Totz, A. P. Aitken, R. Bishop, D. Rueckert, and Z. Wang. Real-time single image and video super-resolution using an efficient sub-pixel convolutional neural network. In CVPR, 2016.
K. Simonyan and A. Zisserman. Very deep convolutional networks for large-scale image recognition. In ICLR, 2015.
S. Su, M. Delbracio, J. Wang, G. Sapiro, W. Heidrich, and O. Wang. Deep video deblurring for hand-held cameras. In CVPR, 2017.
C. Szegedy, W. Liu, Y. Jia, P. Sermanet, S. Reed, D. Anguelov, D. Erhan, V. Vanhoucke, and A. Rabinovich. Going deeper with convolutions. In CVPR, 2015.
H. Talebi and P. Milanfar. Learned perceptual image enhancement. In ICCP, 2018.
G. K. Wallace. The JPEG still picture compression standard. ACM— Special issue on digital multimedia Commun., 34(4):30-44, 1991.
Z. Wang, A. C. Bovik, H. R. Sheikh, and E. P. Simoncelli. Image quality assessment: from error visibility to structural similarity. TIP, 13(4):600-612, 2004.
Z. Wang, E. P. Simoncelli, and A. C. Bovik. Multiscale structural similarity for image quality assessment. In AC-SSC, 2003.
L. Xu, J. S. J. Ren, C. Liu, and J. Jia. Deep convolutional neural network for image deconvolution. In NIPS, 2014.
Z. Yan, H. Zhang, B. Wang, S. Paris, and Y. Yu. Automatic photo adjustment using deep neural networks. TOG, 35(2):1-15, 2016.
S. W. Zamir, J. Vazquez-Corral, and M. Bertalmío. Gamut mapping in cinematography through perceptually-based contrast modification. JSTSP, 8(3):490-503, 2014.
R. Zhang, P. Isola, and A. A. Efros. Colorful image colorization. In ECCV, 2016.

* cited by examiner

SYSTEMS AND METHODS FOR TRANSFORMING RAW SENSOR DATA CAPTURED IN LOW-LIGHT CONDITIONS TO WELL-EXPOSED IMAGES USING NEURAL NETWORK ARCHITECTURES

TECHNICAL FIELD

This disclosure is related to improved techniques for generating well-exposed images from raw image sensor data captured in low-light conditions and, more particularly, to techniques that utilize trained neural networks and artificial intelligence (AI) algorithms to generate well-exposed images from raw image sensor data captured under low-light conditions.

BACKGROUND

Conventional imaging techniques produce sub-optimal images in low-light conditions. The images produced under these conditions are usually dark and noisy due to low photon counts and low signal-to-noise ratios (SNRs). Ambient light is not sufficient to accurately capture detail scene and color information, thereby yielding dark images with little or no visible detail.

Various techniques have been used to generate images captured in low-light conditions, including techniques that rely on long exposure times, large lenses with fast aperture speeds, exposure bracketing, burst imaging and fusion, and flash photography. However, each of these techniques comes with a trade-off and many of the techniques cannot be utilized in particular devices or scenarios. For example, techniques that utilize long exposure times often produce blurred images due to camera shake and/or object movement in a scene. Moreover, using a large lens with a fast aperture speed is not feasible with many types of cameras, such as mobile cameras, that are typically limited by thickness and power constraints. While exposure bracketing can capture a series of images in quick succession with varying shuttering speeds, the quality of the images captured using exposure bracketing are often unsatisfactory in low-light conditions. Burst imaging and fusion techniques often have misalignment problems that cause artifacts to appear in the images, and flash photography often causes unwanted reflections, glare, and shadows, while distorting the scene illumination.

BRIEF DESCRIPTION OF DRAWINGS

The patent or application file contains at least one drawing executed in color. Copies of this patent or patent application publication with color drawing(s) will be provided by the Office upon request and payment of the necessary fee.

To facilitate further description of the embodiments, the following drawings are provided, in which like references are intended to refer to like or corresponding parts, and in which.

DETAILED DESCRIPTION OF EXEMPLARY EMBODIMENTS

The present disclosure relates to systems, methods, and apparatuses that are configured to transform raw image sensor data captured under low-light conditions into well-exposed images. An image generation system includes a neural network architecture that is trained to generate the images. The neural network architecture may be trained, at least in part, using a novel multi-criterion loss function that enables the neural network architecture to learn an entire camera processing pipeline, including functions associated with pre-processing sensor data, demosaicking, color correction, gamma correction, and post-processing. The neural network architecture utilizes a combination of both pixel-level and feature-level information to generate images with enhanced sharpness, color vividness, and contrast, while eliminating noise and artifacts from the images. The disclosure herein describes exemplary implementations of these techniques.

The image generation system can include various sub-components that enable performance of the aforementioned functions. The sub-components can include an image restoration subnet (or subnetwork), a perceptual loss subnet, and a contrast correction module. The image restoration subnet and perceptual loss subnet are integrated into a neural network architecture that is trained using a multi-criterion loss function to produce enhanced images from raw image sensor data captured in low-light conditions. In a first processing stage, the image restoration subnet includes an encoder-decoder architecture that transforms the raw image sensor data to generate the well-lit images. During training, the perceptual loss subnet communicates with the image restoration subnet to cause the encoder-decoder architecture to produce images perceptually similar to well-exposed reference images. In a second processing stage, the images output by the encoder-decoder architecture are processed by the contrast correction module to improve the contrast of the images.

In certain embodiments, the multi-criterion loss function that is used to train the neural network architecture jointly models the local and global properties of images using both pixel-level image details and feature-level image details. The multi-criterion loss function may further incorporate perceptual similarity measures to ensure that the outputs of the encoder-decoder architecture are of high-quality and perceptually similar to the reference images used during training. During training, the image generation system is provided with both a set of input images comprising the short-exposure raw sensor data and a corresponding well-exposed set of reference images. The image restoration subnet learns a mapping function to transform the raw sensor data into enhanced images with well-exposed qualities, and the parameters of the mapping function are updated and sharpened throughout the training procedure using the multi-criterion loss function. Once trained, the image generation system can be utilized to generate images with well-exposed properties from raw image sensor data that is captured in low-light conditions.

The technologies discussed herein can be used in a variety of different contexts and environments. One useful application is in the context of enhancing camera or imaging systems and devices. For example, the present technologies may be integrated directly into cameras or devices that include cameras to produce enhanced images. Alternatively, or additionally, the present technologies can be integrated into a system or platform that receives raw image sensor data produced by cameras or imaging devices and the system or platform can utilize the raw sensor data to produce enhanced images. Another useful application of these technologies is in the context of computer vision. For example, the present technologies may be integrated into a computer vision application or system to produce enhanced images that can assist with various tasks including, but not limited to, classification, visibility analysis, object tracking, and/or event detection. Another useful application is in the context of surveillance systems. For example, integrating the present technologies into a surveillance system or application would permit individuals or objects to be more accurately identified in low-light conditions. The technologies discussed herein can also be applied to many other types of systems as well.

As evidenced by the disclosure herein, the inventive techniques set forth in this disclosure are rooted in computer technologies that overcome existing problems in known imaging systems, specifically problems dealing with generating images from sensor data captured in low-light conditions. As mentioned above, many known imaging systems utilize flash photography or other techniques (e.g., which rely on long exposure times, large lenses with fast aperture speeds, exposure bracketing, or burst imaging and fusion) to account for low-light conditions, each of which is associated with particular drawbacks. The techniques described in this disclosure provide a technical solution (e.g., one that utilizes various AI-based neural networks and/or machine learning techniques) for overcoming the limitations associated with these techniques. For example, the image generation techniques described herein take advantage of novel AI and machine learning techniques to learn properties of well-exposed images and to reflect those properties in images that are captured in low-light conditions. In addition, these techniques utilize a combination of both pixel-level and feature-level information to generate images with enhanced sharpness, color vividness, and contrast, and which are noise-free and do not include artifacts. This technology-based solution marks an improvement over existing capabilities and functionalities related to imaging systems by improving the generation of images from raw sensor data that is captured in low-light conditions.

In certain embodiments, a system is provided for generating an image. The system includes one or more computing devices comprising one or more processors and one or more non-transitory storage devices for storing instructions, wherein execution of the instructions by the one or more processors causes the one or more computing devices to: execute a training procedure that utilizes a multi-criterion loss function to train a neural network architecture to transform raw image sensor data into corresponding output images, wherein: (a) a set of training images comprising input images and reference images are utilized to train the neural network architecture; (b) the input images comprise raw image sensor data that is captured in low-light conditions relative to the reference images; (c) the neural network architecture learns properties of the reference images and utilizes the learned properties to generate the output images; and (d) the multi-criterion loss function at least utilizes a pixel-level loss criterion and a feature-level loss criterion that is utilized to train the neural network architecture to generate the output images; receive an input image comprising raw image sensor data; and generate, using the trained neural network architecture, an output image from the raw image sensor data based on the learned properties.

In certain embodiments, a method is provided for generating an image. The method comprises: executing a training procedure that utilizes a multi-criterion loss function to train a neural network architecture to transform raw image sensor data into corresponding output images, wherein: (a) a set of training images comprising input images and reference images are utilized to train the neural network architecture; (b) the input images comprise raw image sensor data that is captured in low-light conditions relative to the reference images; (c) the neural network architecture learns properties of the reference images and utilizes the learned properties to generate the output images; and (d) the multi-criterion loss function at least utilizes a pixel-level loss criterion and a feature-level loss criterion that is utilized to train the neural network architecture to generate the output images; receiving an input image comprising raw image sensor data; and generating, using the trained neural network architecture, an output image from the raw image sensor data based on the learned properties.

In certain embodiments, a computer program product is provided for generating an image. The computer program product comprises a non-transitory computer-readable medium including instructions for causing a computer to execute a training procedure that utilizes a multi-criterion loss function to train a neural network architecture to transform raw image sensor data into corresponding output images, wherein: (a) a set of training images comprising input images and reference images are utilized to train the neural network architecture; (b) the input images comprise raw image sensor data that is captured in low-light conditions relative to the reference images; (c) the neural network architecture learns properties of the reference images and utilizes the learned properties to generate the output images; and (d) the multi-criterion loss function at least utilizes a pixel-level loss criterion and a feature-level loss criterion that is utilized to train the neural network architecture to generate the output images; receive an input image comprising raw image sensor data; and generate, using the trained neural network architecture, an output image from the raw image sensor data based on the learned properties.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
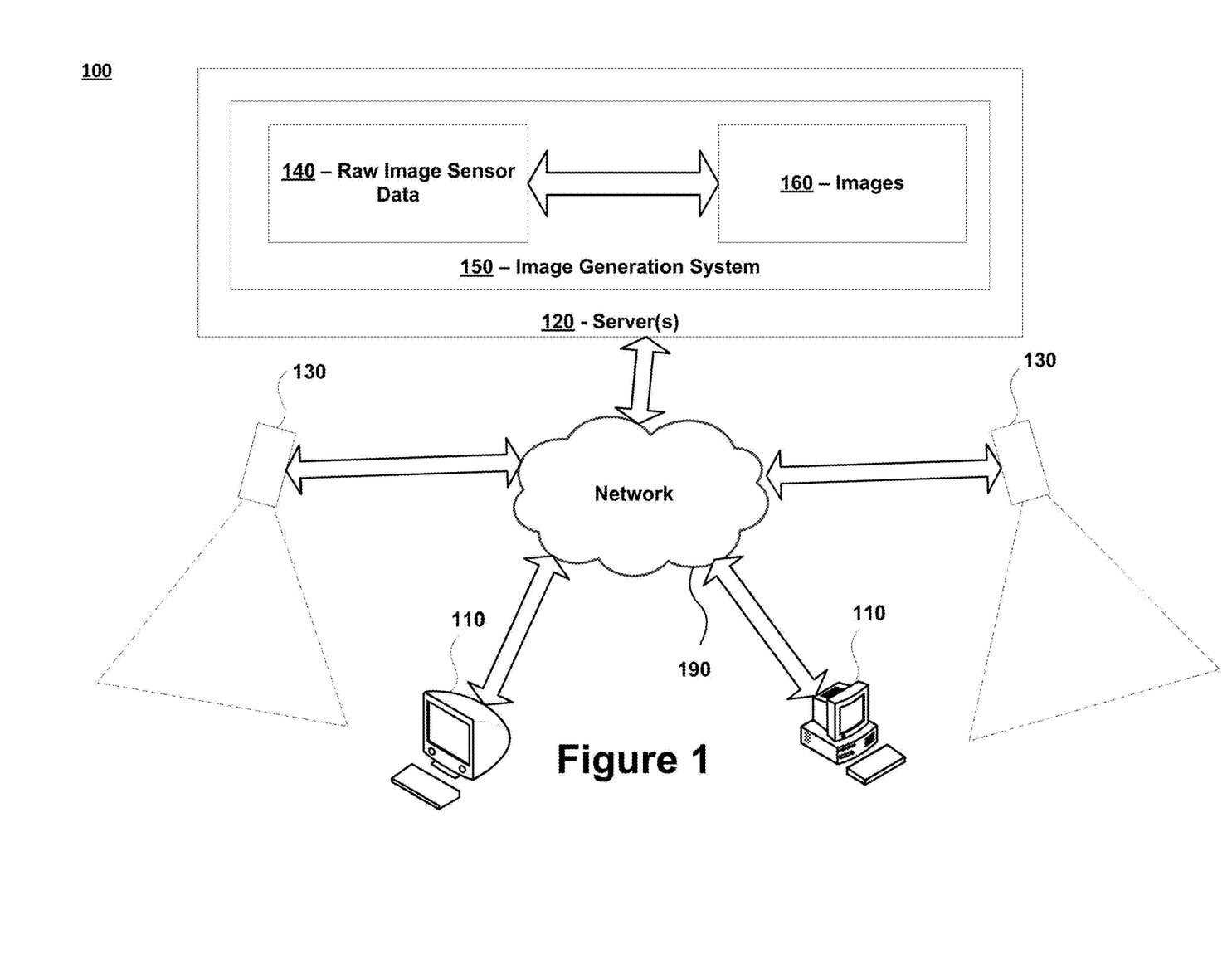
FIG. 1 is a diagram of an exemplary system for generating images in accordance with certain embodiments.

FIG. 1 is a diagram of an exemplary system 100 for generating images in accordance with certain embodiments. The system 100 comprises one or more computing devices 110, one or more servers 120, and one or more camera devices 130 that are in communication over a network 190. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110, servers 120, and camera devices 130 can be configured to communicate directly with each other and/or over the network 190 via wired or wireless communication links, or a combination of the two. Each of the computing devices 110, servers 120, and camera devices 130 can also be equipped with one or more transceiver devices, one or more computer storage devices (e.g., RAM, ROM, PROM, SRAM, etc.) and one or more processing devices (e.g., central processing units) that are capable of executing computer program instructions. The computer storage devices can be physical, non-transitory mediums.

In certain embodiments, the computing devices 110 may represent desktop computers, laptop computers, mobile devices (e.g., smart phones, personal digital assistants, tablet devices, vehicular computing devices or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110, camera devices 130, and other devices over the network 190 (e.g., over the Internet).

An image generation system 150 is stored on, and executed by, the one or more servers 120. The image generation system 150 can be configured to perform any and all operations associated with generating images 160. The image generation system 150 is configured with specialized functionality that enables well-exposed or enhanced images 160 to be generated from raw image data 140 that is captured in low lighting conditions. The image generation system 150 can generate these enhanced images 160 without the use of flash photography or other well-known techniques (e.g., which rely on long exposure times, large lenses with fast aperture speeds, exposure bracketing, or burst imaging and fusion) that are commonly used to accommodate low light conditions.

As explained in further detail throughout this disclosure, image generation system 150 is able to generate the images 160 using a trained neural network architecture that has learned the desired properties of well-exposed images and which reflects those properties in images that are captured in low ambient light environments. The neural network architecture is trained, at least in part, with a multi-criterion loss function that enables the neural network architecture to utilize a combination of both pixel-level and feature-level information to generate images. The images 160 produced by the neural network architecture can be further enhanced by a contrast correction module.

The image generation system 150 can be configured to learn and execute functions associated with a traditional camera imaging pipeline. This can include functions associated with any or all of the following:

(a) Preprocessing functions: Preprocessing functions associated with processing the raw image sensor data 140, such as functions that account for defective sensor cells, lens shading, light scattering and dark current.

(b) White balancing functions: White balancing functions associated with estimating scene illumination and removing its effect by linearly scaling the raw image sensor data 140 such that the reproduced image has no color cast.

(c) Demosaicking functions: Demosaicking functions associated with reconstructing color images from incomplete color samples output from image sensors and estimating missing color information by interpolation.

(d) Color correction functions: Color correction functions associated with transforming the image from a sensor-specific color space to a linear sRGB (standard Red Green Blue) color space.

(e) Gamma correction functions: Gamma correction functions associated with mapping luminance values.

(f) Post-processing functions: Post-processing functions associated with various camera-specific or proprietary operations to improve image quality, such as contrast enhancement, style and aesthetic adjustments, denoising, tone mapping, and data compression.

The neural network architecture of the image generation system 150 can be trained to learn any or all of the aforementioned functions. The neural network architecture of the image generation system 150 can also be trained to learn properties of well-exposed images that are provided during a training phase. The neural network architecture then applies this learned knowledge to generate images 160 from short-exposure raw sensor data 140 that is captured in low-light conditions. Exemplary low-light conditions can include conditions in which the ambient light reaching the camera is approximately between 0.03 lux to 5 lux.

In the exemplary system 100 shown in FIG. 1, the image generation system 150 is stored on, and executed by, the one or more servers 120. In other exemplary systems, the image generation system 150 can additionally, or alternatively, be stored on, and executed by, the computing devices 110 and/or the one or more camera devices 130. For example, in certain embodiments, the image generation system 150 can be integrated directly into a camera device 130 to enable the camera device 130 to generate images 160 using the techniques described herein. Likewise, the image generation system 150 can also be stored as a local application on a computing device 110 to implement the techniques described herein.

The camera devices 130 described throughout this disclosure can include any devices that include an imaging sensor, camera or optical device. For example, the camera devices 130 may represent still image cameras, video cameras, and/or other devices that include image/video sensors. The camera devices 130 can also refer to other types of devices that include imaging sensors, cameras or optical devices and which are capable of performing other functions unrelated to capturing images. For example, the camera devices can include mobile devices (e.g., smart phones or cell phones), tablet devices, computing devices 110, desktop computers, etc. The raw image sensor data 140 provided to the image generation system 150 can be captured by the camera devices 130 and/or can be transmitted (e.g., over network 190) to the image generation system 150 by the one or more computing devices 110 and/or one or more camera devices 130.

The images 160 captured by the cameras may include still images, video images, and/or other types of image data, and the images may be captured in digital format. In certain embodiments, the images 160 output by the image generation system 150 can include sRGB images. The camera devices 130 can be equipped with analog-to-digital (A/D) converters based on the configuration or design of the camera devices 130. The camera devices 130 may also be equipped with communication devices (e.g., transceiver devices) and communication interfaces.

In certain embodiments, the one or more computing devices 110 can enable individuals to access the image generation system 150 over the network 190 (e.g., over the Internet via a web browser application). For example, after a camera device 130 has captured raw image sensor data 140, an individual can utilize a computing device 110 to transmit the raw image sensor data 140 over the network 190 to the image generation system 150. The image generation system can then generate an image 160 from the raw image sensor data 140 based on the techniques described herein. Any images 160 generated by the image generation system 150 can be transmitted over the network 190 to one or more computing devices and/or one or more camera devices 130.

As mentioned above, the techniques described herein are able to produce images from raw image sensor data 140 captured in low-light conditions without relying on traditional techniques that utilize flash photography, long exposure times, large lenses with fast aperture speeds, exposure bracketing, or burst imaging and fusion. However, it should be understood that certain embodiments of the image generation system 150 may utilize one or more of these techniques to supplement the image generation techniques described herein.

Figure 2:
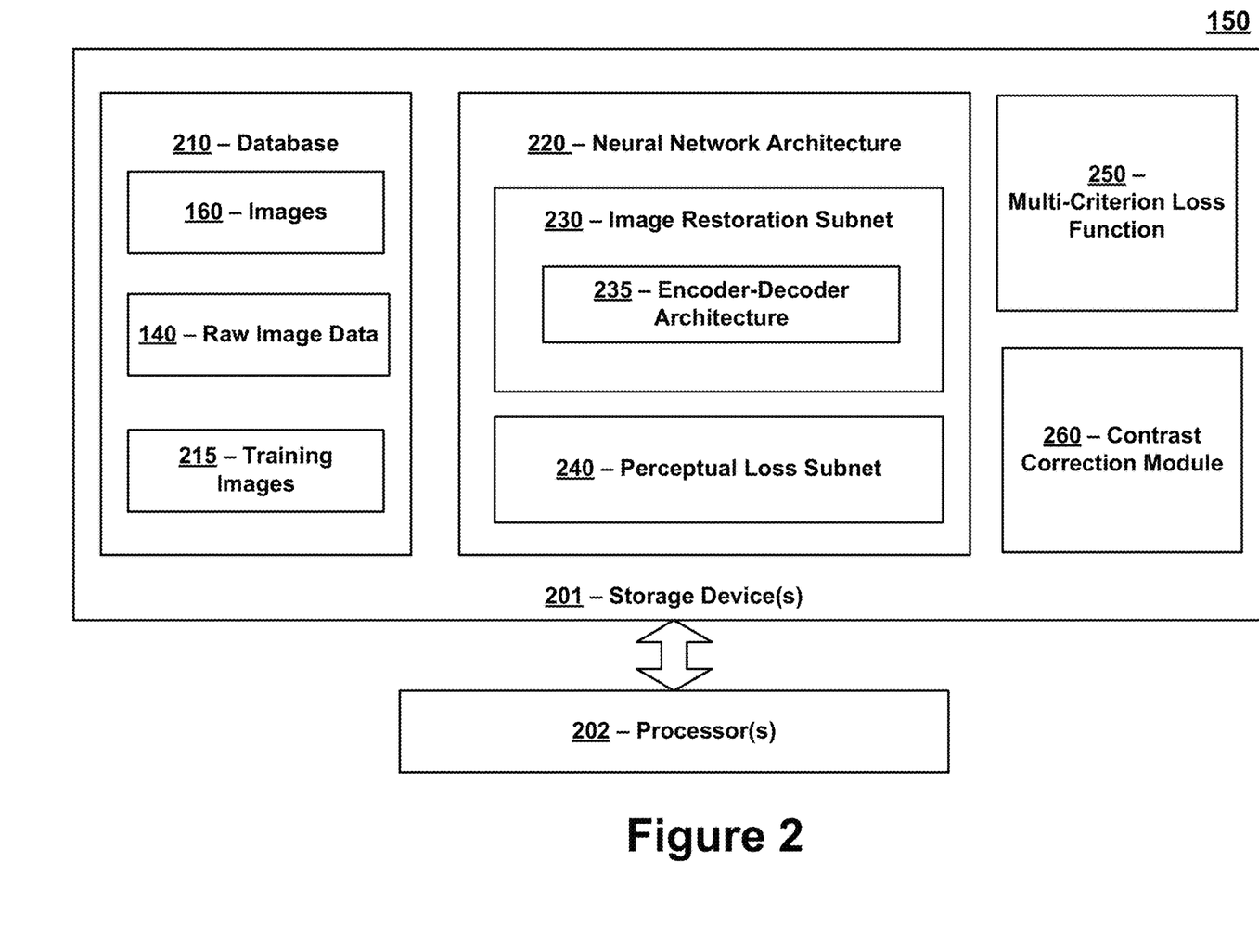
FIG. 2 is a block diagram of an exemplary image generation system in accordance with certain embodiments.

FIG. 2 is a block diagram of an image generation system 150 in accordance with certain embodiments of the present invention. The image generation system 150 includes one or more storage devices 201 that are in communication with one or more processors 202. The one or more storage devices 201 can include: i) non-volatile memory, such as, for example, read only memory (ROM) or programmable read only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more central processing units (CPUs), controllers, microprocessors, digital signal processors, and/or computational circuits. The one or more storage devices 201 can store data and instructions associated with a database 210, a neural network architecture 220 that comprises an image restoration subnet 230 and a perceptual loss subnet 240, a multi-criterion loss function 250, and a color contrast module 260. The one or more processors 202 are configured to execute instructions associated with these components. Each of these components is described in further detail below.

The database 210 stores the raw image sensor 140 and the images 160 that are generated by the image generation system 150. The database also stores a set of training images 215 that are utilized to train the neural network architecture 220.

The neural network architecture 220 of the image generation system 150 is trained to learn properties of well-exposed images and to utilize this knowledge to create images 160 from short-exposure raw sensor data 140 that has been captured in low-light conditions. During a training phase, the neural network architecture 220 can be provided with a set of training images 215 that comprises: (1) a first set of input images that include short-exposure raw sensor data captured in low-light conditions; and (2) a second set of well-exposed reference images, each of which corresponds to one or more of the input images included in the first set. The well-exposed reference images can be utilized to train the neural network architecture to generate images 160 from the raw sensor data associated with the first set of input images. In certain embodiments, exemplary "low-light conditions" may refer to conditions in which the ambient illuminance reaching the camera is approximately in the range of 0.2 to 5 lux for outdoor scenes and approximately in the range of 0.03 lux to 0.3 lux for indoor scenes. A "short-exposure" time may refer to an exposure time approximately in the range of $\frac{1}{30}$ to $\frac{1}{10}$ seconds, while "well-exposed" images may refer to images that are captured during an exposure time that is greater than 10 seconds (e.g., in the approximate range of 10 to 30 seconds). The aforementioned ranges associated with the terms "low-light conditions," "short-exposure" times, and "well-exposed" images are not intended to be limiting and one of ordinary skill in the art would recognize that other appropriate ranges may be used.

The neural network architecture 220 comprises an image restoration subnet 230 and a perceptual loss subnet 240. The image restoration subnet 230 may include a convolutional neural network (CNN) that is utilized to implement an encoder-decoder architecture 235. In certain embodiments, the image restoration subnet 230 and/or encoder-decoder architecture 235 utilizes a U-net encoder-decoder structure with symmetric skip connections between the lower layers of the encoder and the corresponding higher layers of the decoder. The skip connections between the encoder and decoder enable adequate propagation of context information and high-resolution details to be preserved. During training, the aim of the encoder-decoder architecture 235 is to generate images 160 (e.g., sRGB images) from raw sensor input data 140 included in the training images 215 and to generate the images 160 to be as similar as possible to corresponding reference images included in the training images 215.

The perceptual loss subnet 240 may represent a feed-forward CNN. In certain embodiments, the perceptual loss subnet 240 may be implemented using a VGG network architecture (e.g., which may utilize a 3×3 convolutional layers stacked on top of each other in increasing depth). During training, the perceptual loss subnet 240 communicates with the image restoration subnet 230 to produce images as perceptually similar as possible to the reference images included in the training images 215.

The multi-criterion loss function 250 is used to train the image restoration subnet 230 comprising the encoder-decoder architecture 235. The multi-criterion loss function 250 jointly models the local and global properties of images using both pixel-level image details and feature-level image details. Because the multi-criterion loss function 250 accounts for both pixel-level and feature-level attributes of the images 160, this enables the encoder-decoder architecture 235 to generate images that are sharp, perceptually faithful and free from artifacts. The multi-criterion loss function 250 can also include perceptual similarity measures to ensure that the outputs of the encoder-decoder architecture 235 are of high-quality and perceptually similar to the reference images used during training. The multi-criterion loss function 250 enables the image restoration subnet 230 and/or encoder-decoder architecture 235 to learn a mapping function that is able to map raw sensor data to images (e.g., sRGB images) that have well-exposed qualities. While the image restoration subnet 230 and/or encoder-decoder architecture 235 is being trained, the parameters of the mapping function are updated and/or refined using the multi-criterion loss function 250.

Images captured in low-to-dim light conditions often lack contrast and color vividness. The contrast correction module 260 is configured to improve the contrast of the images that are output by the image restoration subnet 230. The manner in which the contrast correction module 260 adjusts the contrast of the images can vary. In certain embodiments, the contrast correction module 260 applies a contrast correction technique that includes inverting the intensity values of the image, applying an image dehazing algorithm to the inverted image, and inverting back the intensity values of the image. This technique is an improvement over traditional histogram equalization techniques that tend to spread the histogram of the image to make it uniform, which causes problems in low-light images as they tend to make dark pixels go towards black which results in a loss of detail and color in the images. Further details regarding exemplary implementations of the contrast correction module 260 are discussed below.

Exemplary embodiments of the image generation system 150 and the aforementioned sub-components (e.g., database 210, neural network architecture 220 image restoration subnet 230, encoder-decoder architecture 235, perceptual loss subnet 240, multi-criterion loss function 250, and color contrast module 260) are described in further detail below. While the sub-components of the image generation system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the image generation system 150 may be illustrated as being implemented in software in certain portions of this disclosure, it should be recognized that the sub-components described herein may be implemented in hardware and/or software.

Figure 3:
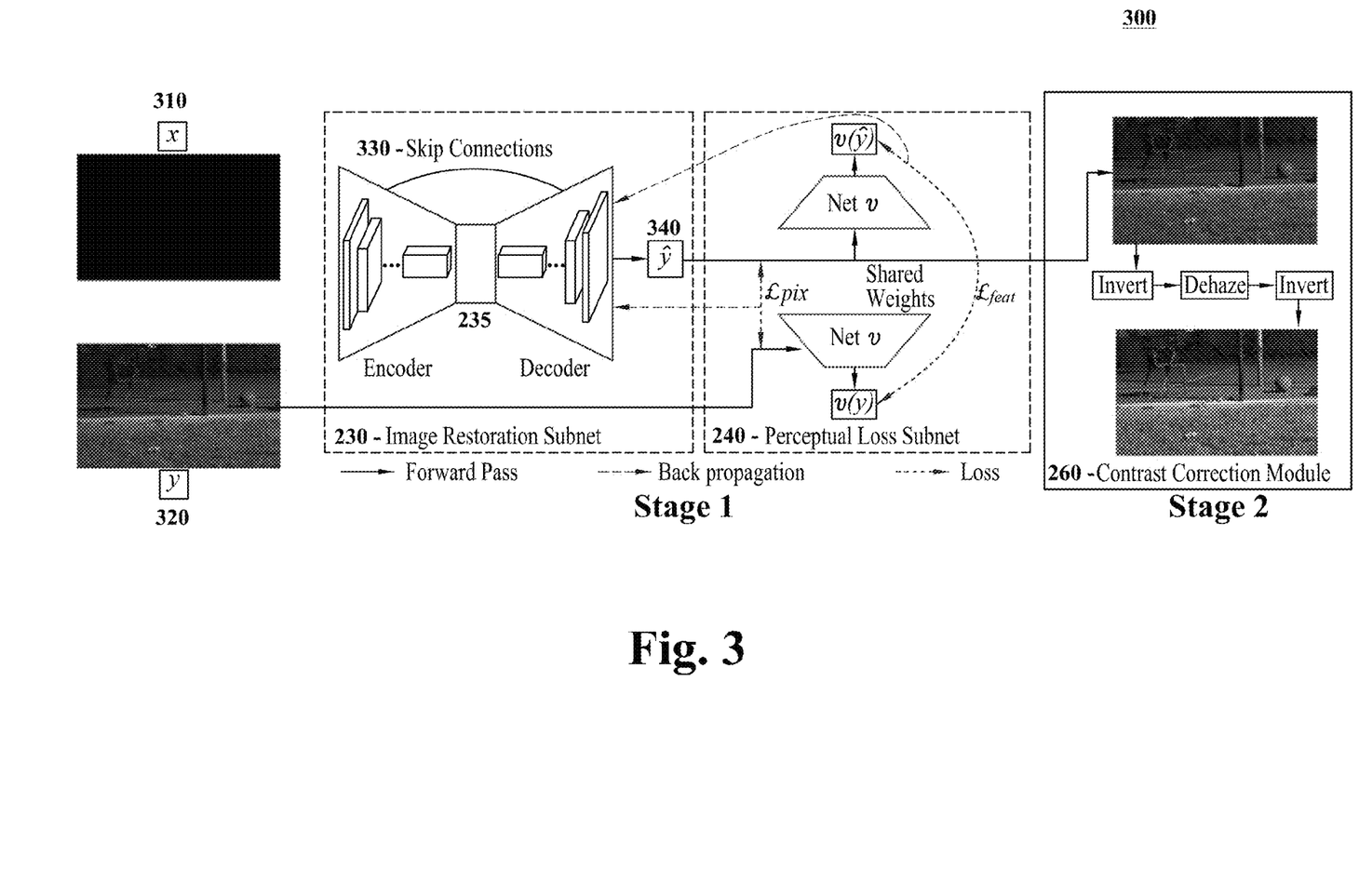
FIG. 3 is a diagram illustrating an exemplary architecture for an image generation system in accordance with certain embodiments.

FIG. 3 is a diagram illustrating an exemplary architecture 300 for an image generation system 150 in accordance with certain embodiments. The architecture 300 illustrates exemplary configurations for the image restoration subnet 230, the perceptual loss subnet 240, and the contrast correction module 260. The image restoration subnet 230 comprises an encoder-decoder architecture 235 that includes skip connections 330 between the contraction and expansion pathways. The image restoration subnet 230 may be implemented as a convolution neural network that incorporates a U-net encoder-decoder structure. The perceptual loss subnet 240 may be implemented as a feed-forward convolution neural network.

Training images 215 are provided to train the image restoration subnet 230. The training images 215 include a set of input images 310 (also labeled "x") that correspond to short-exposure raw image sensor data captured in low light conditions. The training images 215 also include a set of well-exposed reference images 320 (also labeled "y"), which have be converted into the sRGB color space. During training, the image restoration subnet 230 receives pairs of the input images 310 and the reference images 320 that correspond to one another, and the image restoration subnet 230 aims to generate sRGB images from the raw image sensor data of the input images 310 such that the generated images are identical as possible to the corresponding well-exposed reference images 320. The perceptual loss subnet 240 assists the image restoration subnet 230 with accomplishing this goal.

Output images 340 (also labeled ŷ) generated by the encoder-decoder architecture 235 are provided to the contrast correction module 260. The contrast correction module 260 adjust the contrast of the output images 340 by inverting the intensity values of the image, applying an image dehazing algorithm to the inverted image, and inverting back the intensity values of the image.

Before getting into further specifics of each of these sub-components, a formulation of the multi-criterion loss function 250 that is used during training is provided.

Multi-Criterion Loss Function

As mentioned above, the multi-criterion loss function 250 jointly models the local and global properties of images using pixel-level image details as well as high-level image feature representations. Moreover, it explicitly incorporates perceptual similarity measures to ensure high-quality visual outputs.

Given an input image x and the desired output image y, the image restoration subnet learns a mapping function $f(x;\theta)$. The parameters $\theta$ an be updated using the following multi-criterion loss formulation:

$$\theta^* = \operatorname*{argmin}_{\theta} \mathbb{E}_{x,y}\left[\sum_k \alpha_k \mathcal{L}_k(g^k(x;\psi), h^k(y;\phi))\right] \quad (1)$$

where:
x is the input low-light raw image;
y is the desired output (i.e., the corresponding well-exposed RGB image);
$\mathcal{L}$ denotes expectation over variables x and y;
$\mathcal{L}$ denotes a loss function;
$g^k$ and $h^k$ are processing functions for input and desired output, respectively;
$\psi$ and $\phi$ denote the parameters for functions $g^k$ and $h^k$, respectively;
$\alpha$ denotes one or more weights for each loss function;
$\Sigma$ denotes sum operator;
k is the number of loss functions;
$\theta$ denotes the set of network parameters; and
$\arg^{min}$ denotes the minimum argument operator.

$\mathcal{L}_k$ denotes the individual loss function, and $g^k(\bullet)$, $h^k(\bullet)$ are functions on the input image 310 and reference image 320 (also referred to as the target image), respectively, whose definitions vary depending on the type of loss. Two distinct representation levels (pixel-level and feature-level) are considered to compute two loss criterion, i.e., $\mathcal{L}_k \in \{\mathcal{L}_{pix}, \mathcal{L}_{feat}\}$. The first loss criterion, $\mathcal{L}_{pix}$, is pixel-based and accounts for low-level image detail. The pixel-level loss is further divided into two terms: standard $\ell_1$ loss and structure similarity loss. The second loss criterion, $\mathcal{L}_{feat}$, is a high-level perceptual loss based on intermediate deep feature representations. Both of these are discussed in further detail below.

The $\mathcal{L}_{pix}$ loss in Eq. (1) computes error directly on the pixel-level information of the network's output and the ground-truth image. In this case, the definitions of $g^{pix}$ and $h^{pix}$ are: $g^{pix}=f(x;\theta)=\hat{y}, h^{pix}=1(y)$. The loss function can be defined as:

$$\mathcal{L}_{pix}=\beta \ell_1(\hat{y},y)+(1-\beta)\mathcal{L}_{MS\text{-}SSIM}(\hat{y},y) \qquad (2)$$

where:
 $\beta \in [0, 1]$ is a weight parameter that i set using grid search on the validation set;
 x is the input low-light raw image;
 y is the desired output i.e., the corresponding well-exposed RGB image;
 $\hat{y}$ is the estimated output from the network;
 $\ell_1$ denotes the L1 loss function;
 $\mathcal{L}_{pix}$ denotes the pixel-level loss function;
 $\mathcal{L}_{MS\text{-}SSIM}$ denotes MS-SS IM loss function;
 $g^k$ and $h^k$ are processing functions for input and desired output, respectively;
 $\beta$ denotes weight for each loss function; and
 $\theta$ denotes the set of network parameters.

Absolute deviation: The $\ell_1$ error directly minimizes the difference between the network output and the ground-truth to transform low-light images to well-exposed ones. Given $\hat{y}$ and y, the $\ell_1$ loss can be computed as:

$$\ell_1(\hat{y}, y) = \frac{1}{N}\sum_{p=1}^{N}|\hat{y}_p - y_p|, \qquad (3)$$

where:
 p is the pixel location;
 N denotes the total number of pixels in the image;
 $\ell_1$ denotes the L1 loss function;
 y is the desired output i.e., the corresponding well-exposed RGB image;
 $\hat{y}$ is the estimated output from the network; and
 $\Sigma$ denotes a sum operator.

Although the $\ell_1$ metric is a popular choice for the loss function, it produces images with splotchy textures. To avoid such artifacts, a structural similarity measure is introduced into in Eq. (2).

Structural similarity measure: This term ensures the perceptual change in the structural content of output images to be minimal. In certain embodiments, a multi-scale structural similarity measure (MS-SSIM) may be utilized as follows:

$$\mathcal{L}_{MS\text{-}SSIM}(\hat{y}, y) = 1 - \frac{1}{N}\sum_{p=1}^{N} MS\text{-}SSIM(\hat{y}_p, y_p). \qquad (4)$$

where:
 p is the pixel location;
 N denotes the total number of pixels in the image;
 $\mathcal{L}_{MS\text{-}SSIM}$ denotes MS-SSIM loss function;
 MS-SSIM represents the image quality metric;
 y is the desired output i.e., the corresponding well-exposed RGB image;
 $\hat{y}$ is the estimated output from the network; and
 $\Sigma$ denotes a sum operator.

In order to define the MS-SSIM, assume $\mu_{\hat{y}}$, $\sigma_{\hat{y}}^2$ and $\sigma_{\hat{y}y}$ are the mean of image $\hat{y}$, the variance of $\hat{y}$, and the covariance of image $\hat{y}$ and image y, respectively. Then, $$SSIM(\hat{y}, y) = \frac{2\mu_{\hat{y}}\mu_y + C_1}{\mu_{\hat{y}}^2 + \mu_y^2 + C_1} \cdot \frac{2\sigma_{\hat{y}y} + C_2}{\sigma_{\hat{y}}^2 + \sigma_y^2 + C_2} \qquad (5)$$

$$= l(\hat{y}, y) \cdot cs(\hat{y}, y) \qquad (6)$$

where:
 y is the desired output i.e., the corresponding well-exposed RGB image;
 $\hat{y}$ is the estimated output from the network;
 $\mu_{\hat{y}}$ is the mean of image $\hat{y}$;
 $\mu_y$ is the mean of image y;
 $\sigma_{\hat{y}}^2$ denotes the variance of image $\hat{y}$;
 $\sigma_y^2$ denotes the variance of image y;
 $\sigma_{\hat{y}y}$ denotes the covariance;
 $l(\hat{y},y)$ compares the luminance of image $\hat{y}$ with image y;
 $cs(\hat{y},y)$ compares the content and structural differences between image $\hat{y}$ and image y;
 C1 and C2 are constants; and
 SSIM represents the image quality metric.

The above leads to the following:

$$MS\text{-}SSIM(\hat{y},y)=(l_M(\hat{y},y)^{\gamma^M} \cdot \Pi_{i=1}^{M}[cs_i(\hat{y},y)]^{\eta_i}, \qquad (7)$$

where:
 y is the desired output i.e., the corresponding well-exposed RGB image;
 $\hat{y}$ is the estimated output from the network;
 M denotes the scale;
 $\gamma$ and $\eta$ are the constants;
 $l(\hat{y},y)$ compares the luminance of image $\hat{y}$ with image y;
 $cs(\hat{y},y)$ compares the content and structural differences between image $\hat{y}$ and image y;
 $\Pi$ denotes the multiplication operation; and
 MS-SSIM represents the image quality metric.

The first term in Eq. (7) compares the luminance of image $\hat{y}$ with the luminance of reference image y, and it is computed only at scale M. The second term measures the contrast and structural differences at various scales. $\gamma_M$ and $\eta_i$ adjust the relative importance of each term and, for convenience, $\gamma_M=\eta_i=1$ for $i=\{1,\ldots M\}$. $C_1$ and $C_2$ in Eq. (5) are set as small constants.

The pixel-level loss term is valuable for preserving original colors and detail in the reproduced images. However, it does not integrate perceptually sound global scene detail because the structural similarity is only enforced locally. To resolve this problem, an additional loss term is utilized that quantifies the perceptual viability of the generated outputs in terms of a higher-order feature representation obtained from the perceptual loss subnet 340.

In the feature loss term of the objective function in Eq. 1, instead of calculating errors directly on the pixel-level, the difference between the feature representations of the output images 340 and ground-truth images 320 (i.e., reference images) may be extracted with a deep network pre-trained on the ImageNet dataset. Note that this choice is motivated as a result of the suitability of deep features as a perceptual metric. In this case, the functions $g^{feat}$ and $h^{feat}$ are defined as $g^{feat}=h^{feat}=v^l(\bullet)$, where $v^l(\bullet)$ denotes the $l^{th}$ layer activation map from the network. The loss term is formulated as:

$$\mathcal{L}_{feat}(\hat{y}, y) = \frac{1}{N}\|v^l(\hat{y}; \psi) - v^l(y; \psi)\|_2^2, \qquad (8)$$

where:
y is the desired output i.e., the corresponding well-exposed RGB image;
$\hat{y}$ is the estimated output from the network;
N denotes the total number of pixels in the image;
ψ denote the parameters for functions $v^k$ respectively;
l denotes the layer number;
$v^l$ denotes the neural network function; and
$\mathcal{L}_{feat}$ is the feature loss.

In certain embodiments, the VGG-16 network can be used to extract feature representations. Additionally, or alternatively, other image classification networks such as AlexNet, ResNet, or GoogLeNet can be used to extract feature representations. The perceptual loss function $\mathcal{L}_{feat}$ enforces the image restoration subnet 230 to generate outputs that are perceptually similar to their corresponding well-exposed reference images 320.

Image Restoration Subnet

In certain embodiments, the image restoration subnet 230 inherits a U-net encoder-decoder structure with symmetric skip connections 330 between the lower layers of the encoder and the corresponding higher layers of the decoder. The benefits of such a design for the image restoration subnet 230 are three-fold: (a) it has superior performance on image restoration and segmentation tasks; (b) it can process a full-resolution image (e.g., at 4240×2832 or 6000×4000 resolution) due to its fully convolutional design and low memory signature; and (c) the skip connections 330 between the encoder and decoder modules enable adequate propagation of context information and preserve high-resolution details. The image restoration subnet 230 operates on raw sensor data rather than RGB images, given that one potential application of the techniques described herein may be to replace the traditional camera pipeline with an automatically learned network.

In certain embodiments, the image restoration subnet comprises a total of 23 convolutional layers. Among these, the encoder module has 10 convolutional layers, arranged as five pairs of 3×3 layers. Each pair can be followed by a leaky ReLU non-linearity (LReLU(x)=max(0,x)+0.2 min(0,x)) and a 2×2 max-pooling operator for subsampling. The decoder module has a total of 13 convolutional layers. These layers may be arranged as a set of four blocks, each of which consists of a transpose convolutional layer whose output is concatenated with the corresponding features maps from the encoder module, followed by two 3×3 convolutional layers. The number of channels in the feature maps is progressively reduced and the spatial resolution is increased due to the transpose convolutional layers. Finally, a 1×1 convolutional layer, followed by a sub-pixel layer, is applied to remap the channels and obtain the RGB image with the same spatial resolution as the original raw image.

Perceptual Loss Subnet

In certain embodiments, the perceptual loss subnet 240 may comprise a truncated version of VGG-16. For example, only the first two convolutional layers of VGG-16 may be used to obtain the feature representation after ReLU non-linearity. This feature representation accurately encodes the style and perceptual content of an image. The result is a H/4×W/4×128 tensor for both the output of the image restoration net and the ground-truth images 320, which are then used to compute the similarity between them.

Contrast Correction Module

Images captured in low-to-dim light conditions often lack contrast and color vividness. A classical method to enhance the visual quality of such images is to perform histogram equalization, which spreads the histogram of the image to make it uniform. Standard contrast enhancement methods are not suitable for improving the contrast of low-light images as they tend to make dark pixels go towards black, therefore causing a loss of detail and color. This is especially true with images captured in extremely difficult lighting.

To address this issue, the architecture includes a contrast correction module 260 that executes an image enhancement procedure that drastically improves the color contrast, thereby producing compelling results. The design of the contrast correction module 260 is based on the observation that the histogram of outputs produced by the image restoration subnet 230 may be skewed towards dark regions.

Figure 4:
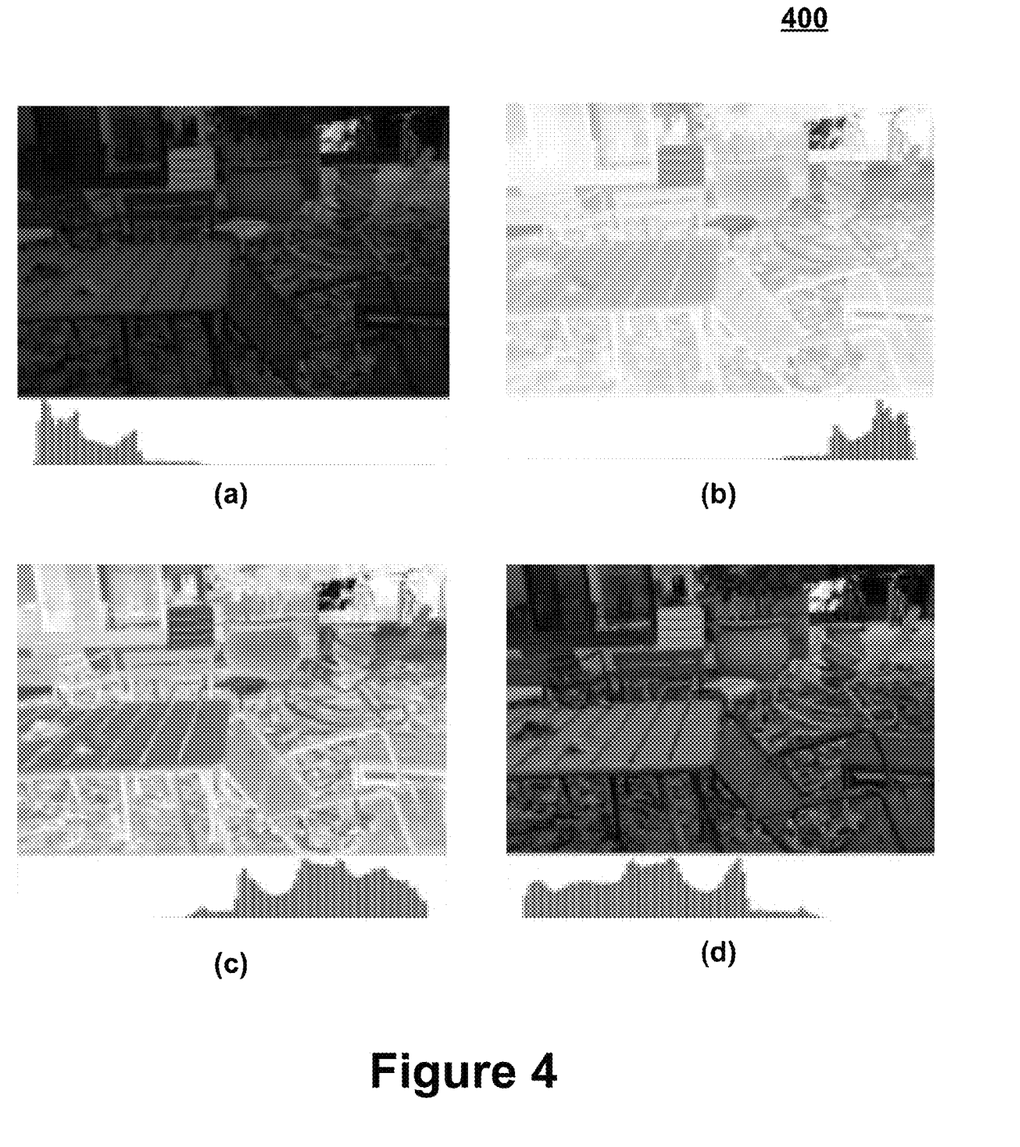
FIG. 4 includes a series of images demonstrating exemplary actions performed by a contrast correction module in accordance with certain embodiments.

FIG. 4 demonstrates the operations that may be performed by the contrast correction module 260 according to certain embodiments. FIG. 4(a) shows an exemplary output image 340 produced by the image restoration subnet 230. By inverting the intensity values of the image, the histogram becomes similar to that of a hazy image. FIG. 4(b) shows the output that results after the intensity values are inverted. By applying an image dehazing algorithm, the contrast correction module 260 can make the image histogram more uniform. It is noted that histograms can be computed using the lightness component of the images. FIG. 4(c) shows the output of the contrast correction module 260 after the dehazing algorithm is applied. Finally, inverting back the intensities of the image provides a new image that is bright, sharp, colorful and without artifacts, as shown in FIG. 4(d).

Applying the image enhancement procedure of the contrast correction module 260 as a post-hoc operation provides certain benefits. The image datasets that are used for training the network may include noisy ground-truth images 320. Therefore, if the ground-truth images 320 are pre-processed with the contrast correction module 260 before training, the network may learn to generate visually poor outputs with amplified noise and artifacts. Therefore, to deal with this issue, the ground-truth images 320 are first denoised and the aforementioned procedure is repeated. However, the learned network may yield overly smooth images with a loss of fine detail. Therefore, the contrast correction module 260 may only be used at the inference time.

Experiments

Extensive comparative experiments, psychophysical studies, and ablation studies were conducted using the See-in-the-Dark (SID) public dataset have demonstrated the effectiveness and superiority of the techniques described herein. The SID dataset contains both indoor and outdoor images acquired with two different cameras, having different color filter arrays. The dataset was specifically collected for the development of learning-based methods for low-light photography. The images were captured using two different cameras: Sony α7S II with a Bayer color filter array (CFA) and sensor resolution of 4240×2832, and Fujifilm X-T2 with a X-Trans CFA and 6000×4000 spatial resolution. The dataset contains 5094 short-exposure raw input images and their corresponding long-exposure reference images. There are both indoor and outdoor images of the static scenes. The ambient illuminance reaching the camera was in the range 0.2 to 5 lux for outdoor scenes and between 0.03 lux and 0.3 lux for indoor scenes. Input images were taken with an exposure time between 1/30 and 1/10 seconds and the exposure time for the ground-truth images was 10 to 30 seconds.

Certain pre-processing was performed on the images during the experiments. Many cameras have a color filter array (CFA) in front of the image sensor to capture color information. Different cameras use different types of CFAs with Bayer filter array being the most popular choice due to its simple layout. Images of the SID dataset come from cameras with different CFAs. Therefore, before passing the raw input to the image restoration subnet 230, the data can be packed into 4 channels if it comes from a Bayer CFA and 9 channels if it comes from a X-Trans CFA.

During the experiments, two separate networks were trained: one for the Sony subset and the other for the Fuji subset from the SID dataset. Each network takes as input a short-exposure raw image 310 and a corresponding long-exposure reference image 320 (which can be converted into the sRGB color space with the LibRAW library). The input is prepared using camera-specific preprocessing mentioned above before being passed through the network. Both networks are trained for 4000 epochs using the proposed multi-criterion loss function 250. An Adam optimizer is used with an initial learning rate of $10^{-4}$, which is reduced to $10^{-5}$ after 2000 epochs. In each iteration, a 512×512 crop is taken from the training image and random rotation and flipping is performed. To compute the $\mathcal{L}_{feat}$ (Eq. 8), the features from the conv2 layer were used after ReLU of the VGG-16 network. The batch size can be set to one, and $\alpha$=0.9 and $\beta$=0.99 in Eq. (1) and Eq. (2), respectively.

The results of the experiments conducted show that our method outperforms the state-of-the-art methods according to psychophysical tests, as well as pixel-wise standard metrics and recent learning-based perceptual image quality measures.

Figure 5:
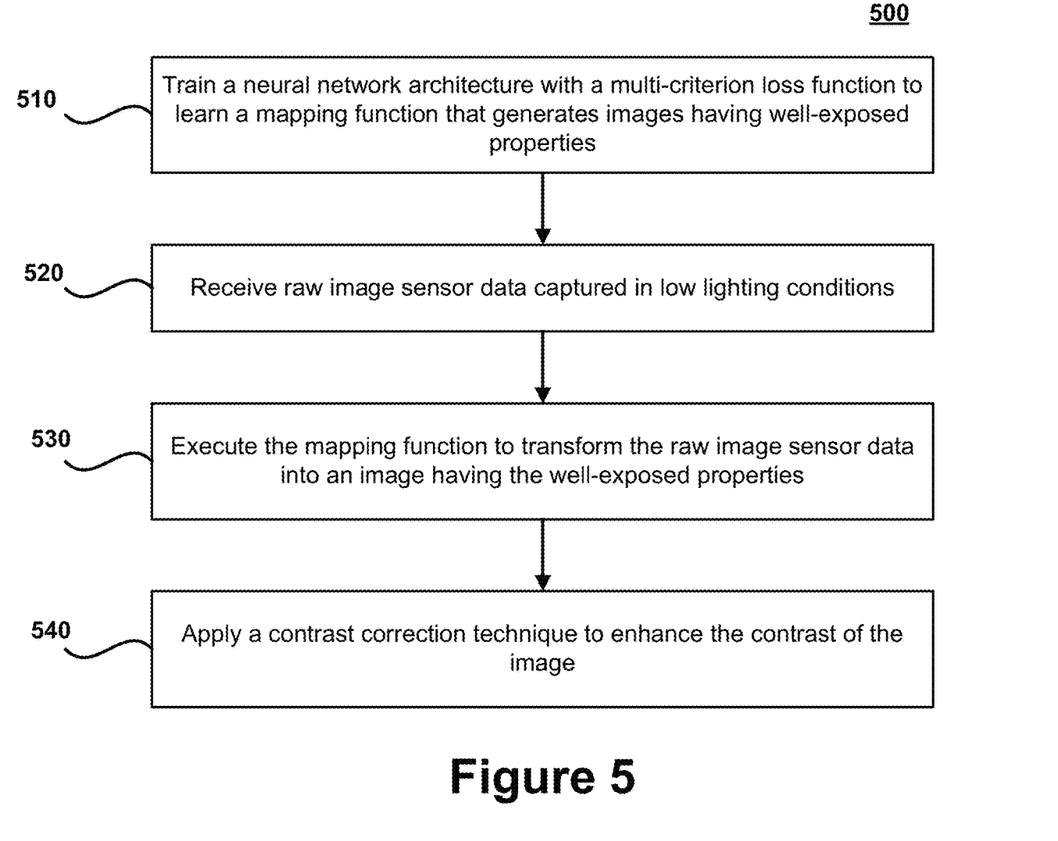
FIG. 5 is a flow chart of an exemplary method for generating an image in accordance with certain embodiments of the present invention.

FIG. 5 illustrates a flow chart for an exemplary method 500 according to certain embodiments. Method 500 is merely exemplary and is not limited to the embodiments presented herein. Method 500 can be employed in many different embodiments or examples not specifically depicted or described herein. In some embodiments, the steps of method 500 can be performed in the order presented. In other embodiments, the steps of method 500 can be performed in any suitable order. In still other embodiments, one or more of the steps of method 500 can be combined or skipped. In many embodiments, image generation system 150 can be suitable to perform method 500 and/or one or more of the steps of method 500. In these or other embodiments, one or more of the steps of method 500 can be implemented as one or more computer instructions configured to run at one or more processing modules (e.g., processor 202) and configured to be stored at one or more non-transitory memory storage modules (e.g., storage device 201). Such non-transitory memory storage modules can be part of a computer system such as image generation system 150, system 100 and/or system 300.

At step 510, a neural network architecture 220 is trained with a multi-criterion loss function 250 to learn a mapping function that generates images 160 having well-exposed properties. As explained above, the neural network architecture 220 may include an image restoration subnet 230 that includes a encoder-decoder architecture 235 that generates images 160 from raw image sensor data 140 using a mapping function. During training, the neural network architecture 220 may also include a perceptual loss subnet 240 that assists the image restoration subnet 230 with producing output images that as perceptually similar as possible to reference images that are included in a set of training images 215. The multi-criterion loss function 250 that assists with training the neural network architecture 220 jointly models properties of images using both pixel-level image details as well as high-level image feature representations.

At step 520, raw image sensor data 140 that is captured in low lighting conditions is received. The raw image sensor data 140 may be received by the image generation system 150 in various ways. For example, the raw image sensor data 140 can be transmitted to the image generation system 150 over a network 190 by a camera device 130 and/or computing device 130. Additionally, or alternatively, the raw image sensor data 140 can be supplied directly to the image generation system 150 by a camera device 130 or computing device 130 that has captured the raw image sensor data 140. In certain embodiments, after the image generation system 150 has been trained, all or a portion of the image generation system 150 may be integrated into a camera device 130 that generates the raw image sensor data 140 and provides the raw image sensor data 140 directly to the image generation system 150 installed on the camera device 130.

At step 530, the mapping function is executed to transform the raw image sensor data 140 into an image 160 having the having well-exposed properties. The image 160 generated from the raw sensor data 140 can be in any appropriate format. In certain embodiments, the image 160 represents a sRGB image.

At step 540, a contrast correction technique is applied to enhance the contrast of the image. In certain embodiments, the contrast correction technique improves the contrast of the image by inverting the intensity values of the image, applying an image dehazing algorithm to the inverted image, and inverting back the intensity values of the image.

While various novel features of the invention have been shown, described and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for generating an image comprising:
one or more computing devices comprising one or more processors and one or more non-transitory storage devices for storing instructions, wherein execution of the instructions by the one or more processors causes the one or more computing devices to:
execute a training procedure that utilizes a multi-criterion loss function to train a neural network architecture to transform raw image sensor data into corresponding output images, wherein:
a set of training images comprising input images and reference images are utilized to train the neural network architecture;
the input images comprise raw image sensor data that is captured in low-light conditions relative to the reference images;
the neural network architecture learns properties of the reference images and utilizes the learned properties to generate the output images; and
the multi-criterion loss function at least includes a pixel-level loss criterion and a feature-level loss criterion that is utilized to train the neural network architecture to generate the output images, wherein the feature-level loss criterion quantifies perceptual metrics of high-order feature representations derived from a perceptual loss subnet that is trained to extract global image characteristics;
receive an input image comprising raw image sensor data; and
generate, using the multi-criterion loss function of the trained neural network architecture, an output image from the raw image sensor data based on the learned properties.

2. The system of claim 1, wherein the trained neural network architecture includes an image restoration subnet that comprises an encoder-decoder architecture for generating the output image.

3. The system of claim 2, wherein the perceptual loss subnet communicates with the image restoration subnet during the training procedure to cause the encoder-decoder architecture to produce images that are perceptually similar to the reference images included in the set of training images.

4. The system of claim 2, wherein the training procedure enables the image restoration subnet to learn a mapping function that maps the input images to the output images.

5. The system of claim 4, wherein the multi-criterion loss function is utilized to update one or more parameters of the mapping function during the training procedure.

6. The system of claim 1, wherein the output image is processed by a contrast correction module that is configured to adjust the contrast of the output image.

7. The system of claim 6, wherein the contrast correction module adjusts the contrast of the output image by:
inverting intensity values of the output image;
applying an image dehazing algorithm to the output image having inverted intensity values; and
inverting back the intensity values of the output image after the image dehazing algorithm is applied.

8. The system of claim 1, wherein the multi-criterion loss function jointly models both pixel-level image details and feature-level image details.

9. The system of claim 8, wherein the multi-criterion loss function further includes one or more perceptual similarity measures that reduces artifacts in the output images generated by the neural network architecture.

10. The system of claim 1, wherein the input image comprising the raw image sensor data is captured in low-light conditions in which ambient illuminance reaching a camera that captured the input image was in a range of 0.03 lux to 5 lux.

11. A method for generating an image comprising:
executing a training procedure that utilizes a multi-criterion loss function to train a neural network architecture to transform raw image sensor data into corresponding output images, wherein:
a set of training images comprising input images and reference images are utilized to train the neural network architecture;
the input images comprise raw image sensor data that is captured in low-light conditions relative to the reference images;
the neural network architecture learns properties of the reference images and utilizes the learned properties to generate the output images; and
the multi-criterion loss function at least includes a pixel-level loss criterion and a feature-level loss criterion that is utilized to train the neural network architecture to generate the output images, wherein the feature-level loss criterion quantifies perceptual metrics of high-order feature representations derived from a perceptual loss subnet that is trained to extract global image characteristics;
receiving an input image comprising raw image sensor data; and
generating, using the multi-criterion loss function of the trained neural network architecture, an output image from the raw image sensor data based on the learned properties.

12. The method of claim 11, wherein the trained neural network architecture includes an image restoration subnet that comprises an encoder-decoder architecture for generating the output image.

13. The method of claim 12, wherein perceptual loss subnet communicates with the image restoration subnet during the training procedure to cause the encoder-decoder architecture to produce images that are perceptually similar to the reference images included in the set of training images.

14. The method of claim 12, wherein the training procedure enables the image restoration subnet to learn a mapping function that maps the input images to the output images.

15. The method of claim 14, wherein the multi-criterion loss function is utilized to update one or more parameters of the mapping function during the training procedure.

16. The method of claim 11, wherein the output image is processed by a contrast correction module that is configured to adjust the contrast of the output image.

17. The method of claim 16, wherein the contrast correction module adjusts the contrast of the output image by:
inverting intensity values of the output image;
applying an image dehazing algorithm to the output image having inverted intensity values; and
inverting back the intensity values of the output image after the image dehazing algorithm is applied.

18. The method of claim 11, wherein the multi-criterion loss function jointly models both pixel-level image details and feature-level image details.

19. The method of claim 18, wherein the multi-criterion loss function further includes one or more perceptual similarity measures that reduces artifacts in the output images generated by the neural network architecture.

20. A computer program product for generating an image, the computer program product comprising a non-transitory computer-readable medium including instructions for causing a computer to:
- execute a training procedure that utilizes a multi-criterion loss function to train a neural network architecture to transform raw image sensor data into corresponding output images, wherein:
  - a set of training images comprising input images and reference images are utilized to train the neural network architecture;
  - the input images comprise raw image sensor data that is captured in low-light conditions relative to the reference images;
  - the neural network architecture learns properties of the reference images and utilizes the learned properties to generate the output images; and
  - the multi-criterion loss function at least includes a pixel-level loss criterion and a feature-level loss criterion that is utilized to train the neural network architecture to generate the output images, wherein the feature-level loss criterion quantifies perceptual metrics of high-order feature representations derived from a perceptual loss subnet that is trained to extract global image characteristics;
- receive an input image comprising raw image sensor data; and
- generate, using the multi-criterion loss function of the trained neural network architecture, an output image from the raw image sensor data based on the learned properties.

* * * * *